No. 7,432.  
PATENTED JUNE 11, 1850.

J. A. WOODBURY.
PLANE FOR TONGUING AND GROOVING BOARDS, &c.

2 SHEETS—SHEET 1.

No. 7,432. PATENTED JUNE 11, 1850.
J. A. WOODBURY.
PLANE FOR TONGUING AND GROOVING BOARDS, &c.

2 SHEETS—SHEET 2.

UNITED STATES PATENT OFFICE.

JAMES A. WOODBURY, OF BOSTON, MASSACHUSETTS.

PLANE FOR TONGUING AND GROOVING BOARDS, &c.

Specification of Letters Patent No. 7,432, dated June 11, 1850.

*To all whom it may concern:*

Be it known that I, JAMES A. WOODBURY, of Boston, in the county of Suffolk and State of Massachusetts, have invented certain new and useful Improvements in Apparatus for Tonguing and Grooving Boards, Planks, &c., and that the following description, taken in connection with the accompanying drawings hereinafter referred to, forms a full and exact specification of the same, wherein I have set forth the nature and principles of my said improvements by which my invention may be distinguished from others of a similar class together with such parts as I claim and desire to have secured to me by Letters Patent.

The figures of the accompanying plate of drawings represent my improvements.

Figure 1:
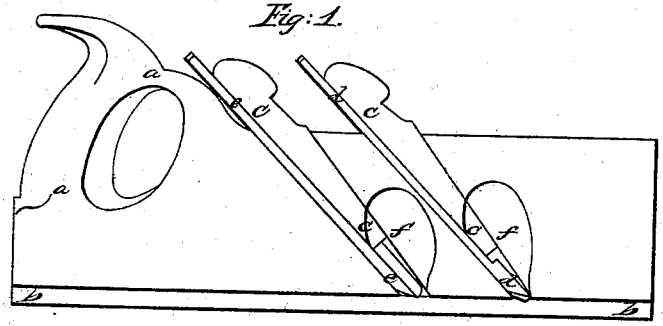
Figure 2:
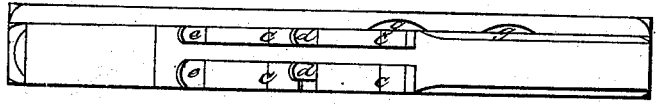
Figure 6:
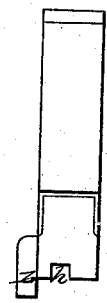
Figure 4:
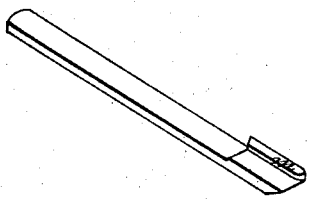
Figure 3:
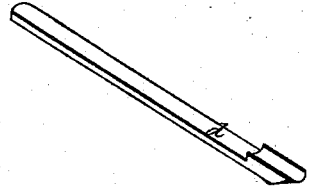
Figure 5:
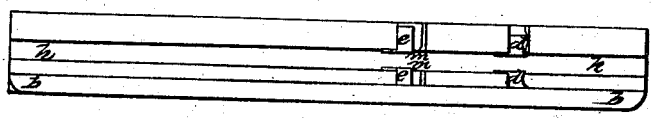
Figure 7:
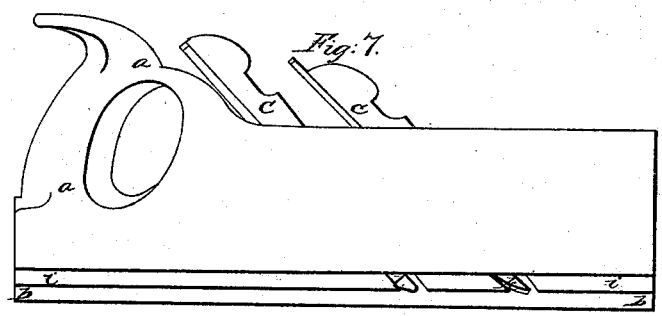
Figure 8:
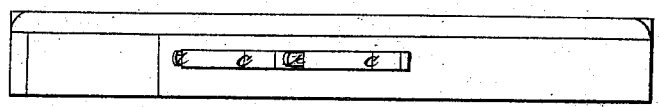
Figure 10:
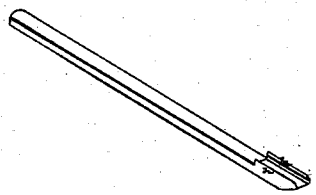
Figure 9:
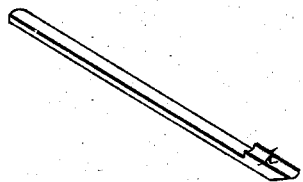
Figure 11:
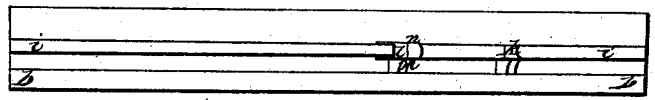

Figure 1 is a side elevation of hand plane arranged with my improvements for cutting, or forming tongues in boards or planks. Fig. 2 is a top view of the same. Fig. 3 is an isometrical perspective view of a gouge used in said plane, and Fig. 4 is a similar view of a smoothing chisel set behind this gouge in said plane; and Fig. 5 is a plan of the underside of said plane, and Fig. 6 is an end view of the same. Precisely similar views of a hand plane for forming grooves in boards or planks, to those represented in Figs. 1, 2, 3, 4, 5 and 6, are shown respectively in Figs. 7, 8, 9, 10, 11 and 12.

As the implements for forming tongues and grooves are now arranged, there is but a single cutting chisel of the ordinary shape or construction, the edge of which penetrates into the wood, and tears out the shaving from the sides of the groove or tongue, and leaves said sides rough and imperfect. While in cross-grained lumber and wet wood it is almost impossible to form a tongue or groove with the tools now in common use. The defective operation of the tools heretofore devised, in the particular above noted, has long been sought to be remedied, and by my improvements the difficulties and imperfections above referred to are entirely obviated.

In my improved apparatus I use two cutting tools or chisels. That which first enters the wood is a gouge-cutter with a semicircular cutting edge, which operates to take out the greater portion of the shaving required to be removed from the groove, or on each side of the tongue. And behind this gouge cutter is set a smoothing cutter having a common chisel edge at the bottom, and on each side thereof a cutting or face, the chisel edge operating to smooth the bottom of the groove &c., and the cutting lips serving to smooth the sides of the grooves and tongues.

The two hand planes shown in the drawings, are constructed in most respects, in the plane stocks, like those in common use for forming tongues and grooves. The handles of both stocks are shown at *a a—a a*, Figs. 1 and 7, and the guiding ledges which fit against the face of the boards or planks, are shown at *b b—b b*, in said figures, and in Figs. 5, 6, 11 and 12. They are both also contrived in the usual way, with the wooden wedges, *c c c* &c., Figs. 1 and 2, 7 and 8, for confining the cutting tools in proper position. The plane for forming the tongue has two sets or series of gouges and smoothing chisels, above referred to, as shown at *d, e—d, e*, Figs. 1, 2 and 5, and two throats, *f f—g g*, on each side for the delivery or escape of the shavings, as shown in said Figs. 1 and 2. It also has the usual groove, *h h*, Figs. 5 and 6, on its under side, which fits, and plays over the tongue as it is made. The grooving plane requires discharging throats but on one side, and has the usual tongue, *i i*, Figs. 7, 11 and 12, along its under side through which the cutting tools pass, and which fits into, and plays through the groove, as it is made deeper and deeper in the board or plank.

As before suggested, and explained, the main feature of my invention consists in the use of gouges, *d—d*, in the tonguing plane, and *k*, in the grooving plane, to precede a smoothing tool, *e—e* and *l*, in said tonguing and grooving planes respectively; the said smoothing tools having lips to cut smoothly on the sides of the grooves and tongues to be formed. The gouges, *d—d* and *k*, have semi-circular cutting edges, and should be so set in the plane stocks, see Figs. 1 and 5, 7 and 11, as that the corners should penetrate into, and engage with the wood first, so as to turn the shavings up into the discharging throats freely. The smoothing irons in the tonguing plane have but one smoothing lip or face, as shown at *m*, Figs. 4 and 5, there being two such tools the front or cutting edge of the lip of one of which cuts on each side of the tongue, while the grooving plane has but one such tool, with a lip, n—n, on each side, the front or cutting edge of which serves to smooth each side of the groove. The smoothing tools which are set behind the gouges in both plane-stocks, shown in the drawings, should, like the gouges, to be so fixed in position, as the upper corners of the front or cutting edges of the side lips, m—n, n, shall first engage with, and penetrate the wood, as, by thus arranging them a "drawing stroke," (so to speak,) is produced, as the planes are moved along, and the shavings, as before suggested, are more freely discharged through the throats formed in the stocks for the purpose.

It will be evident to any mechanic versed in the arts of carpentry or joinery, that the arrangement of tools for forming tongues and grooves hereinabove suggested, and described, may be used in stationary positions in a manner which will be readily understood, on the sides of power planing machines; or a series of alternate gouges smoothing cutters constructed as above described, may be set in a revolving frame or stock, and produce a much improved result on that which is now effected in such machines. A sufficient number of alternate gouges and smoothing cutters, should be used to cut the tongue or groove of any required depth, by passing the board or plank once through the machine. The great end attained by any of the arrangements above described being the removal first by the gouges of the larger portion of the shaving, and then smoothing the sides and bottom of the grooves and sides faces of the tongues and the sunken or rebated edges adjacent to the same, by the smoothing tool, having the lips as described.

Having thus described my improvements, in tonguing and grooving apparatus, I shall state my claim as follows:

What I claim as my invention, and desire to have secured to me by Letters Patent in said apparatus, is—

The combination of a gouge or gouges, (for removing the bulk or greater portion of a shaving in forming tongues or grooves in boards or planks,) with smoothing tools having a chisel edge, a cutting and side lip on either or both sides thereof, (for smoothing the sides and bottom of the grooves, and the edges about the tongues, as set forth); said gouges being set in front of said smoothing tools, and the whole being arranged, and operating substantially, as hereinabove set forth.

Boston March 13th 1850.

JAMES A. WOODBURY.

Witnesses:
 EZRA LINCOLN,
 ROBERT L. HARRIS.